United States Patent
Cotugno et al.

(10) Patent No.: US 9,606,895 B2
(45) Date of Patent: *Mar. 28, 2017

(54) CENTRALIZED DISPATCHING OF APPLICATION ANALYTICS

(71) Applicant: Google Inc., Mountain View, CA (US)

(72) Inventors: James Joseph Cotugno, Dove Canyon, CA (US); Neil Campbell Rhodes, Redlands, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/935,614

(22) Filed: Nov. 9, 2015

(65) Prior Publication Data

US 2016/0062873 A1  Mar. 3, 2016

Related U.S. Application Data

(63) Continuation of application No. 13/760,634, filed on Feb. 6, 2013, now Pat. No. 9,183,110.

(Continued)

(51) Int. Cl.
*G06F 11/36* (2006.01)
*G06F 11/34* (2006.01)
(Continued)

(52) U.S. Cl.
CPC ............ *G06F 11/3612* (2013.01); *G06F 9/44* (2013.01); *G06F 9/44594* (2013.01);
(Continued)

(58) Field of Classification Search
CPC ........... G06Q 30/0267; G06Q 30/0255; G06Q 30/0269; G06Q 30/0261; G06Q 30/0246;
(Continued)

(56) References Cited

U.S. PATENT DOCUMENTS 7,433,694 B2  10/2008  Morgan et al.
7,804,804 B2   9/2010  Sugaya et al.
(Continued)

FOREIGN PATENT DOCUMENTS

EP  2360578 A1  8/2011

OTHER PUBLICATIONS

Office Action dated Sep. 2, 2016 as received in EP Application No. 13802157.1.

(Continued)

*Primary Examiner* — Saket K Daftuar
(74) *Attorney, Agent, or Firm* — Morris & Kamlay LLP

(57) ABSTRACT

A method may include, in a computing device comprising at least one processor and a memory, generating at least one information beacon from each of a plurality of applications installed on the computing device. Each information beacon may include application analytics data associated with a corresponding application while the corresponding application is running on the computing device. The at least one information beacon from each of the plurality of applications may be stored in a common location in the computing device. The stored at least one information beacon may be dispatched from each of the plurality of applications to a network device communicatively coupled to the computing device. The generating may be triggered by beacon generation code implemented in each of the plurality of applications installed on the computing device.

17 Claims, 4 Drawing Sheets

Related U.S. Application Data

(60) Provisional application No. 61/729,714, filed on Nov. 26, 2012.

(51) Int. Cl.

| | | |
|---|---|---|
| *G06F 9/44* | (2006.01) | |
| *H04L 29/08* | (2006.01) | |
| *H04W 64/00* | (2009.01) | |
| *G06F 9/445* | (2006.01) | |
| *G06F 11/22* | (2006.01) | |
| *H04W 88/08* | (2009.01) | |
| *H04W 4/02* | (2009.01) | |
| *H04W 4/00* | (2009.01) | |
| *H04W 8/18* | (2009.01) | |

(52) U.S. Cl.
CPC ...... *G06F 11/2268* (2013.01); *G06F 11/3466* (2013.01); *H04L 67/303* (2013.01); *H04L 67/306* (2013.01); *H04W 64/00* (2013.01); *H04W 4/00* (2013.01); *H04W 4/02* (2013.01); *H04W 8/183* (2013.01); *H04W 88/08* (2013.01)

(58) Field of Classification Search
CPC ............... G06Q 30/0254; G06Q 50/01; G06F 17/30905; G06F 17/30867; G06F 17/30864; G06F 17/30749; G06F 17/3087; G06F 17/30761; H04L 67/20; H04L 67/327; H04L 67/306; H04L 67/303; H04L 41/0816; H04L 67/16; H04W 4/02; H04W 4/24; H04W 4/00; H04W 4/206; H04W 64/00; H04W 28/04; H04W 48/08; H04W 48/18; H04W 48/20; H04W 88/08

See application file for complete search history.

(56) References Cited

U.S. PATENT DOCUMENTS

| | | |
|---|---|---|
| 7,992,135 B1 | 8/2011 | Wong et al. |
| 8,326,260 B1 | 12/2012 | Bradish et al. |
| 8,335,174 B2 | 12/2012 | Bradish et al. |
| 8,484,320 B2 | 7/2013 | Sakano |
| 8,489,558 B2 | 7/2013 | Leigh |
| 8,605,693 B2 | 12/2013 | So et al. |
| 2001/0054026 A1* | 12/2001 | Choate ................ G06F 11/3409 705/52 |
| 2003/0220114 A1 | 11/2003 | Langensteiner et al. |
| 2005/0085279 A1* | 4/2005 | Aoki ................ H04W 52/0216 455/574 |
| 2005/0286480 A1 | 12/2005 | Akiyama |
| 2006/0069801 A1* | 3/2006 | Rich ..................... G06F 9/5072 709/232 |
| 2007/0150565 A1 | 6/2007 | Ayyagari et al. |
| 2007/0283194 A1 | 12/2007 | Villella et al. |
| 2009/0097440 A1 | 4/2009 | Sakoda et al. |
| 2009/0135759 A1 | 5/2009 | Hirano et al. |
| 2009/0138427 A1 | 5/2009 | Kalavade et al. |
| 2009/0177567 A1 | 7/2009 | McKerlich et al. |
| 2009/0291638 A1 | 11/2009 | Sugaya et al. |
| 2009/0298480 A1 | 12/2009 | Khambete et al. |
| 2010/0039960 A1 | 2/2010 | Sugaya |
| 2010/0091698 A1* | 4/2010 | Aibara .............. H04W 52/0216 370/315 |
| 2011/0034204 A1* | 2/2011 | Sawai ..................... H04W 4/02 455/522 |
| 2011/0069630 A1 | 3/2011 | Doppler et al. |
| 2011/0167125 A1* | 7/2011 | Achlioptas ........ G06F 17/30041 709/206 |
| 2012/0011256 A1 | 1/2012 | Masuda et al. |
| 2012/0084866 A1 | 4/2012 | Stolfo et al. |
| 2012/0144384 A1 | 6/2012 | Baek |
| 2012/0147802 A1 | 6/2012 | Ukita et al. |
| 2012/0158954 A1 | 6/2012 | Heffernan et al. |
| 2012/0159584 A1 | 6/2012 | Pizot et al. |
| 2012/0239809 A1 | 9/2012 | Mazumdar et al. |
| 2012/0252441 A1 | 10/2012 | Fujimoto et al. |
| 2012/0254309 A1 | 10/2012 | Tokashiki |
| 2012/0275449 A1 | 11/2012 | Sakoda |
| 2012/0282926 A1 | 11/2012 | Zappulla et al. |
| 2012/0294234 A1 | 11/2012 | Bradish et al. |
| 2012/0295569 A1 | 11/2012 | Bradish et al. |
| 2013/0173691 A1 | 7/2013 | De Schacht et al. |
| 2014/0122703 A1* | 5/2014 | Pugh ....................... H04L 67/22 709/224 |

OTHER PUBLICATIONS

ISR and Written opinion dated Mar. 4, 2014 for PCT/US2013/070048.

* cited by examiner

CENTRALIZED DISPATCHING OF APPLICATION ANALYTICS

CROSS-REFERENCE TO RELATED APPLICATIONS/INCORPORATION BY REFERENCE

This application makes reference to and claims priority to U.S. Provisional Application Ser. No. 61/729,714, filed on Nov. 26, 2012, entitled "CENTRALIZED DISPATCHING OF APPLICATION ANALYTICS," which is incorporated herein by reference in its entirety.

BACKGROUND

Application analytics data is an important component to software developers of applications for computing devices (e.g., smart phones, mobile phones, tablets and/or other mobile devices). However, generation and communication of such analytics data may be challenging since computing devices usually have numerous installed applications. Consequently, a substantial amount of analytics data is generated at different times, and communication of such data may be sporadic (due to lack of connectivity) and may also utilize a significant portion of the device battery resources.

Further limitations and disadvantages of conventional and traditional approaches will become apparent to one of skill in the art, through comparison of such approaches with some aspects of the present method and apparatus set forth in the remainder of this disclosure with reference to the drawings.

SUMMARY

A system and/or method is provided for centralized dispatching of application analytics, substantially as shown in and/or described in connection with at least one of the figures, as set forth more completely in the claims.

In accordance with an example embodiment of the disclosure, a method may include, in a computing device comprising at least one processor and a memory, generating at least one information beacon from each of a plurality of applications installed on the computing device. Each information beacon may include application analytics data associated with a corresponding application while the corresponding application is running on the computing device. The at least one information beacon from each of the plurality of applications may be stored in a common location in the computing device. The stored at least one information beacon may be dispatched from each of the plurality of applications to a network device communicatively coupled to the computing device.

In accordance with another example embodiment of the disclosure, a method may include, in a network device communicatively coupled to a computing device, the computing device comprising a plurality of installed applications, receiving, from the computing device, a plurality of information beacons generated from at least a portion of the plurality of installed applications. Communication of the plurality of information beacons may be triggered by the network device based on a pre-determined schedule. At least one application analytics report associated with usage of at least the portion of the plurality of installed applications by a user of the computing device, may be generated based on the received plurality of information beacons.

These and other advantages, aspects and features of the present disclosure, as well as details of illustrated implementation(s) thereof, will be more fully understood from the following description and drawings.

DETAILED DESCRIPTION

Figure 1:
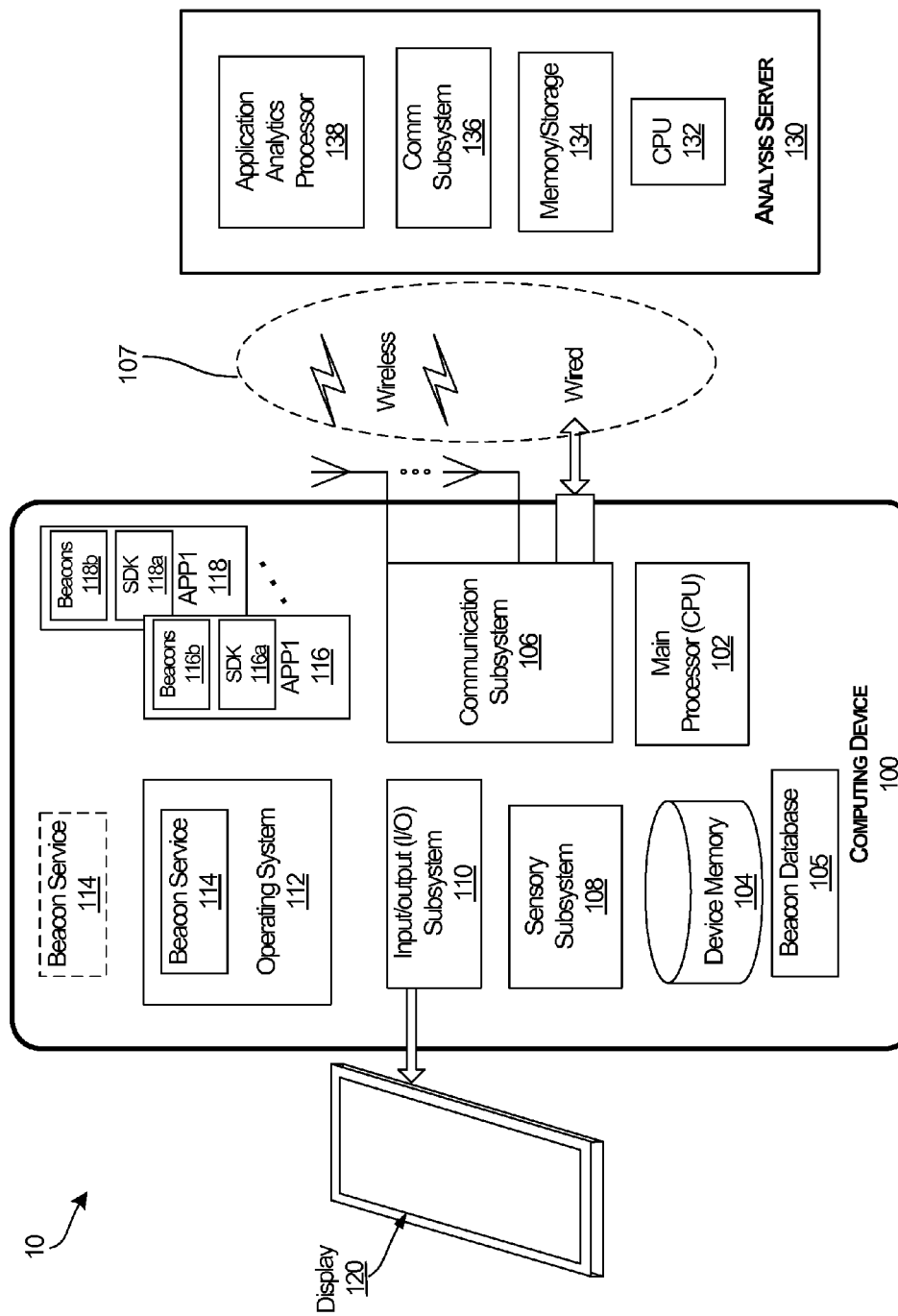
FIG. 1 is a block diagram illustrating an example analytics dispatching architecture, in accordance with an embodiment of the disclosure.

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "e.g.," introduces a list of one or more non-limiting examples, instances, or illustrations. As utilized herein, the term "processor" may be used to refer to one or more of a central processing unit, a processor of a symmetric or asymmetric multiprocessor system, a digital signal processor, a micro-controller, a graphics/video processor, or another type of processor.

As used herein, the term "information beacon" or "beacon" may refer to a data block or structure, which may be generated at various points while an application is being executed (or running) on a device, to provide application-related analytics (e.g., a beacon may indicate a user's interaction with the application user interface (UI), including UI widgets such as buttons on the screen, tabs, textboxes, etc., as well as user interactions with physical buttons). Put another way, a beacon may indicate which part of an application was/is being used, and/or it may indicate a user's interaction with the application (e.g., pressing a button, selecting a tab or a menu, etc.), and/or results achieved while the application is running (e.g., finishing a game level), and/or experimentation information, and/or timing information related to the application. Furthermore, a beacon also indicates the type of device (or other identifying information of the device the application is running on) and identifying information about the operating system running on the device. In this regard, information beacons may be used in various types of applications, such as e-commerce, timing applications, social applications, and others.

The present disclosure relates to a method and system for centralized dispatching of application analytics. In various implementations, an application developer may implement within an application (e.g., by using a software development kit) code for generating analytic information beacons. Such information beacons may be generated at various points of the application to provide application-related analytics (as described in the term definition herein above). The beacon-generating code may be used in a plurality of applications installed on a computing device.

After one or more beacons are generated from any of the applications running the beacon-generation code, the generated beacons may be stored in a common location within the computing device (e.g., a common database). The stored beacons may be dispatched to, for example, an analysis server for further processing and generating of application analytics reports based on the beacons. In this regard, instead of having each application separately manage communication of its own beacons (which may be sporadic due to network connectivity issues while the computing device is moving and may also drain the device battery fast), all beacons from all applications are consolidated in one location (e.g., a database within the computing device). All beacons may then be communicated to the analysis server in one transmission, which will help preserve the device battery life.

FIG. 1 is a block diagram illustrating an example analytics dispatching architecture, in accordance with an embodiment of the disclosure. Referring to FIG. 1, the example architecture 10 may comprise a computing device 100 and an analysis server 130.

The computing device 100 may include a handset, a smartphone, a tablet, a laptop, and/or another handheld or portable device. The computing device 100 may comprise, for example, a main processor 102, a system memory 104, a beacon database 105, a communication subsystem 106, a sensory subsystem 108, an input/output (I/O) subsystem 110, and a display 120. The computing device may also comprise an operating system 112, and one or more applications 116, . . . , 118 running on the computing device 100. The operating system 112 may comprise a beacon service 114. The applications 116, . . . , 118 may comprise SDK modules 116a, . . . , 118a and beacons 116b, . . . , 118b, respectively.

The analysis server may comprise a main processor 132, a system memory 134, a communication subsystem 136, and an application analytics processor 138 (further description of the application analytics processor 138 is disclosed herein below in reference to FIG. 2).

The main processor 102 may comprise suitable logic, circuitry, interfaces, and/or code that may be operable to process data, and/or control and/or manage operations of the computing device 100, and/or tasks and/or applications performed therein in connection with beacon generation and beacon communication functionalities of the computing device 100. In this regard, the main processor 102 may be operable to configure and/or control operations of various components and/or subsystems of the computing device 100, by utilizing, for example, one or more control signals. The main processor 102 enables running and/or execution of applications, programs and/or code (e.g., the beacon service 114 and/or any of the SDKs 116a, . . . , 118a), which may be stored, for example, in the system memory 104. Alternatively, one or more dedicated application processors may be utilized for running and/or executing applications (or programs) (e.g., the beacon service 114 and/or any of the SDKs 116a, . . . , 118a) in the computing device 100.

In some instances, one or more of the applications 116, . . . , 118 running and/or executing on the computing device 100 may generate and/or update video content that may be rendered via the display 120. Additionally, during execution of one or more of the applications 116, . . . , 118, corresponding SDKs 116a, . . . , 118a may cause generation of information beacons 116b, . . . , 118b, respectively, whenever the beacon generating code of the SDKs is called (executed) during execution of the corresponding application. Each of the information beacons 116b, . . . , 118b may comprise analytics information related to its corresponding application (e.g., a beacon may include one or more of data identifying an application accessed on the computing device; data identifying data and time an application was accessed on the computing device; for each application running on the computing device, data identifying at least one application segment accessed while the application was running; data identifying characteristics of one or both of the computing device and the operating system used by the computing device; and/or data identifying one or more buttons pushed by a user while an application is running on the computing device.

The system memory 104 may comprise suitable logic, circuitry, interfaces, and/or code that may enable permanent and/or non-permanent storage, buffering, and/or fetching of data, code and/or other information, which may be used, consumed, and/or processed. In this regard, the system memory 104 may comprise different memory technologies, including, for example, read-only memory (ROM), random access memory (RAM), Flash memory, solid-state drive (SSD), and/or field-programmable gate array (FPGA). The system memory 104 may store, for example, configuration data, which may comprise parameters and/or code, comprising software and/or firmware (e.g., the operating system 112, the update initiators 122 and/or the one or more applications 116, . . . , 118).

The communication subsystem 106 may comprise suitable logic, circuitry, interfaces, and/or code operable to communicate data from and/or to the computing device, such as via one or more wired and/or wireless connections 107. The communication subsystem 106 may be configured to support one or more wired protocols (e.g., Ethernet standards, MOCA, etc.) and/or wireless protocols or interfaces (e.g., CDMA, WCDMA, TDMA, GSM, GPRS, UMTS, EDGE, EGPRS, OFDM, TD-SCDMA, HSDPA, LTE, WiMAX, WiFi, Bluetooth, and/or any other available wireless protocol/interface), facilitating transmission and/or reception of signals to and/or from the computing device 100, and/or processing of transmitted or received signals in accordance with applicable wired or wireless protocols. In this regard, signal processing operations may comprise filtering, amplification, analog-to-digital conversion and/or digital-to-analog conversion, up-conversion/down-conversion of baseband signals, encoding/decoding, encryption/decryption, and/or modulation/demodulation. In accordance with an embodiment of the disclosure, the communication subsystem 106 may provide wired and/or wireless connections to, for example, the analysis server 130 via the wired and/or wireless connections 107.

The sensory subsystem 108 may comprise suitable logic, circuitry, interfaces, and/or code for obtaining and/or generating sensory information, which may relate to the computing device 100, its user(s), and/or its environment. For example, the sensory subsystem 108 may comprise positional or locational sensors (e.g., GPS or other GNSS based sensors), ambient conditions (e.g., temperature, humidity, or light) sensors, and/or motion related sensors (e.g., accelerometer, gyroscope, pedometers, and/or altimeters).

The I/O subsystem 110 may comprise suitable logic, circuitry, interfaces, and/or code for enabling user interactions with the computing device 100, enabling obtaining input from user(s) and/or to providing output to the user(s). The I/O subsystem 110 may support various types of inputs and/or outputs, including, for example, video, audio, and/or textual. In this regard, dedicated I/O devices and/or components, external to or integrated within the computing device 100, may be utilized for inputting and/or outputting data during operations of the I/O subsystem 110. Exemplary I/O devices may comprise displays, mice, keyboards, touch-screens, voice input interfaces, and other input/output interfaces or devices. With respect to video outputs, the I/O subsystem 110 may be operable to generate and/or process video content, graphics, and/or textual data, and/or generate video frames based thereon for display, via the display 120 for example.

The display 120 may comprise suitable logic, circuitry, interfaces and/or code that may enable displaying of video content, which may be handled and/or processed via the I/O subsystem 110. The display 120 may be used in outputting video data.

The operating system 112 may include software that is used to manage the various hardware resources of the computing device 100. The operating system 112 may also be used to provide common services to computer programs or applications, such as the one or more applications 116, . . . , 118. The operating system 112 may act as an intermediary between the hardware components and the one or more applications 116, . . . , 118. In some implementations, the operating system 112 may provide a beacon service 114.

The beacon service 114 may comprise code and may be operable to provide services related to generation and management of the beacons 116*b*, . . . , 118*b*. For example, the beacon service 114 may implement a beacon dispatch policy (e.g., 204 in FIG. 2). A beacon collection policy (e.g., 202 in FIG. 2) may cause collection of the beacons 116*b*, . . . , 118*b* at a pre-determined interval or schedule. The collected beacons may be stored in, for example, the beacon database 105 (which may be a separate module within the device 100 or may be implemented as part of the system memory 104). The beacon collection may be initiated by the processor 102 and/or by the corresponding beacon-generating application and/or by the analysis server 130.

The beacon dispatch policy (e.g., 204 in FIG. 2) may cause dispatching of the collected beacons 116*b*, . . . , 118*b* from the beacon database 105 to the analysis server 130 at a pre-determined time interval or schedule. Additionally, the beacon dispatch policy may be operable to control not only the timing of the dispatch, but also the amount (volume) of each dispatch, dispatch compression/encryption, etc. For example, the beacon dispatch policy may set the dispatch frequency, how many beacons are in each dispatch, whether the dispatch should be compressed and/or encrypted, etc.

The beacon dispatch module 204 may comprise suitable circuitry, logic and/or code and may be operable to implement one or more rules (e.g., a policy) used for dispatching of the collected beacons 116*b*, . . . , 118*b* from the beacon database 105 to the analysis server 130 at a pre-determined time interval or schedule. Additionally, the beacon dispatch policy (of the beacon dispatch module 204) may be operable to control not only the timing of the dispatch, but also the amount (volume) of each dispatch, dispatch compression/encryption, etc. For example, the beacon dispatch policy may set the dispatch frequency, how many beacons are in each dispatch, whether the dispatch should be compressed and/or encrypted, etc.

Even though the beacon service 114 is illustrated as part of the operating system 112, the present disclosure is not limiting in this regard and the beacon service 114 may also be implemented as, for example, a separate service application installed on the device 100.

The one or more applications 116, . . . , 118 may include one or more software applications (i.e., computer programs) that may help a user of the computing device 100 perform a specific task. For example, a software application may include an interactive application that displays content to a user and allows the user to provide input as to the manner in which the content is provided and/or the type of content that is provided. To perform a task (e.g., web browsing, video playback, etc.), the one or more applications 116, . . . , 118 may access the CPU 102, the memory 104, and/or any other circuit within the computing device 100, as well as the operating system 112. The application developer of applications 116, . . . , 118 may use the beacon-generating SDKs 116*a*, . . . , 118*a* at one or more points within the corresponding application, which may trigger the generation of beacons 116*b*, . . . , 118*b* based on the developer's preferences.

The analysis server 130 may comprise suitable circuitry, logic and/or code and may be operable to receive one or more information beacons from the computing device 100. The CPU 132, memory 134 and communication subsystem 136 may perform functionalities that are similar to the functionalities performed by the CPU 102, memory 104, and communication subsystem 106, respectively. The application analytics processor 138 may comprise suitable circuitry, logic and/or code and may be operable to generate one or more analytics reports. Additionally, the application analytics processor 138 may be operable to implement one or more policies with regard to beacon dispatch functionalities performed by the computing device 100.

In operation, one or more of the SDKs 116*a*, . . . , 118*a* may trigger generation of beacons 116*b*, . . . , 118*b*, respectively. The beacon service 114 may cause the generated beacons 116*b*, . . . , 118*b* from applications 116, . . . , 118 to be stored in the beacon database 105. The beacon service 114 may also cause communication of the stored beacons from the beacon database 105 to the analysis server 130 for further processing.

The communication of the stored information beacons may be performed periodically (at a pre-determined time interval or schedule), using the communication subsystem 106 and the wired/wireless connection 107. Additionally, communication of the stored information beacons may be performed when other network traffic occurs between the computing device 100 and the analysis server 130. In this regard, the communication of the beacons may utilize "already-in-use" network connection, thereby reducing battery use by not initiating a network connection only for purposes of communicating beacons. Furthermore, communication of the stored information beacons may be performed only when a particular network interface (e.g., Wi-Fi) is present. For example, the beacons may be communicated only if a Wi-Fi connection is available, which will avoid sending data using a cell data connection (which tends to be more expensive). In this regard, cell data usage may be reduced, potentially lowering a user's cost on a data metered plan.

After the information beacons are received by the analysis server 130, the application analytics processor may generate one or more application analytics report based on the received beacons.

Figure 2:
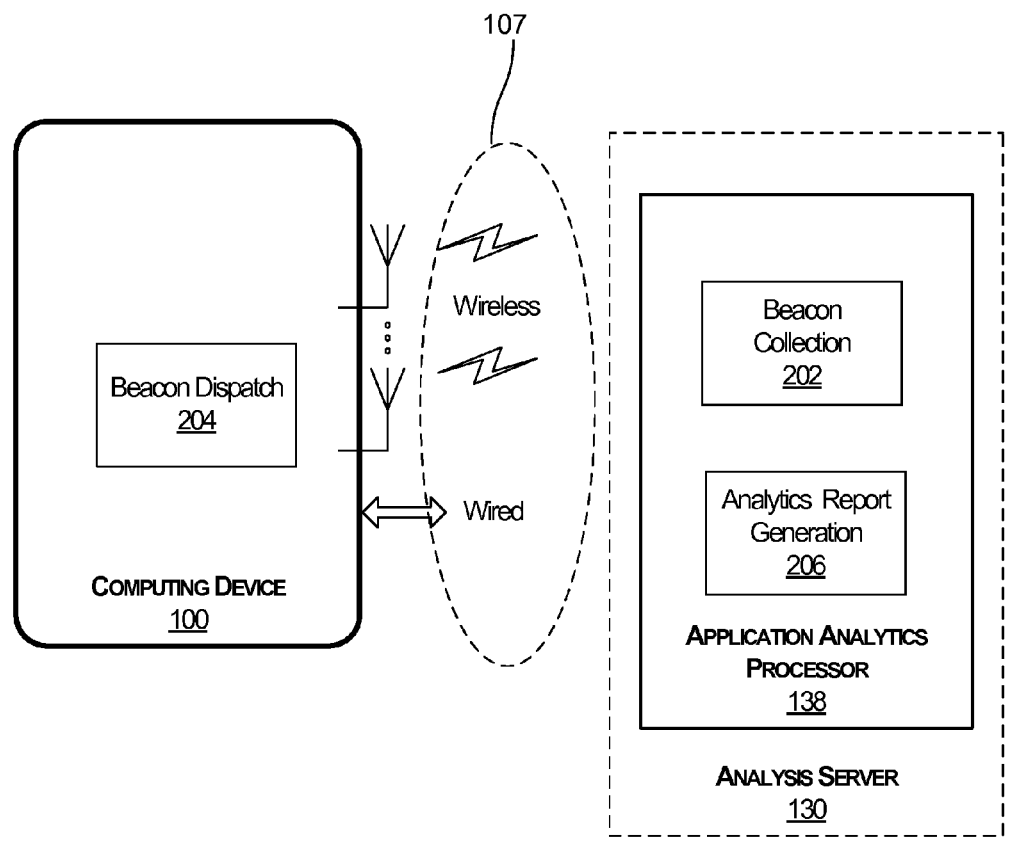
FIG. 2 is a block diagram illustrating beacon processing functionalities of the analytics dispatching architecture of FIG. 1, in accordance with an embodiment of the disclosure.

FIG. 2 is a block diagram illustrating beacon processing functionalities of the analytics dispatching architecture of FIG. 1, in accordance with an embodiment of the disclosure. Referring to FIG. 2, the application analytics processor 138 may comprise a beacon collection module 202 and analytics report generation module 206. The computing device 100 may comprise a beacon dispatch module 204, which may be implemented as part of the operating system 112 or as a stand-alone application.

The beacon collection module 202 may comprise suitable circuitry, logic and/or code and may be operable to implement one or more rules (e.g., a policy) used for collection of the beacons 116b, . . . , 118b (e.g., the policy may set collection of the beacons 116b, . . . , 118b at a pre-determined interval or schedule). The collected beacons may be stored in, for example, the beacon database 105 (which may be a separate module within the device 100 or may be implemented as part of the system memory 104).

The analytics report generation module 206 may comprise suitable circuitry, logic and/or code and may be operable to generate one or more analytics reports based on beacons received from the computing device 100.

Even though the beacon collection module 202 is illustrated as part of the application analytics processor 138, the present disclosure is not limiting in this regard. In accordance with an example embodiment of the disclosure, the beacon collection module 202 may also be implemented within the computing device 100 (e.g., as part of the operating system 112 or as stand-alone applications running on the device 100. In this regard, beacon collection and/or beacon dispatch may be initiated and/or controlled by the analysis server 130 or the computing device 100.

Figure 3:
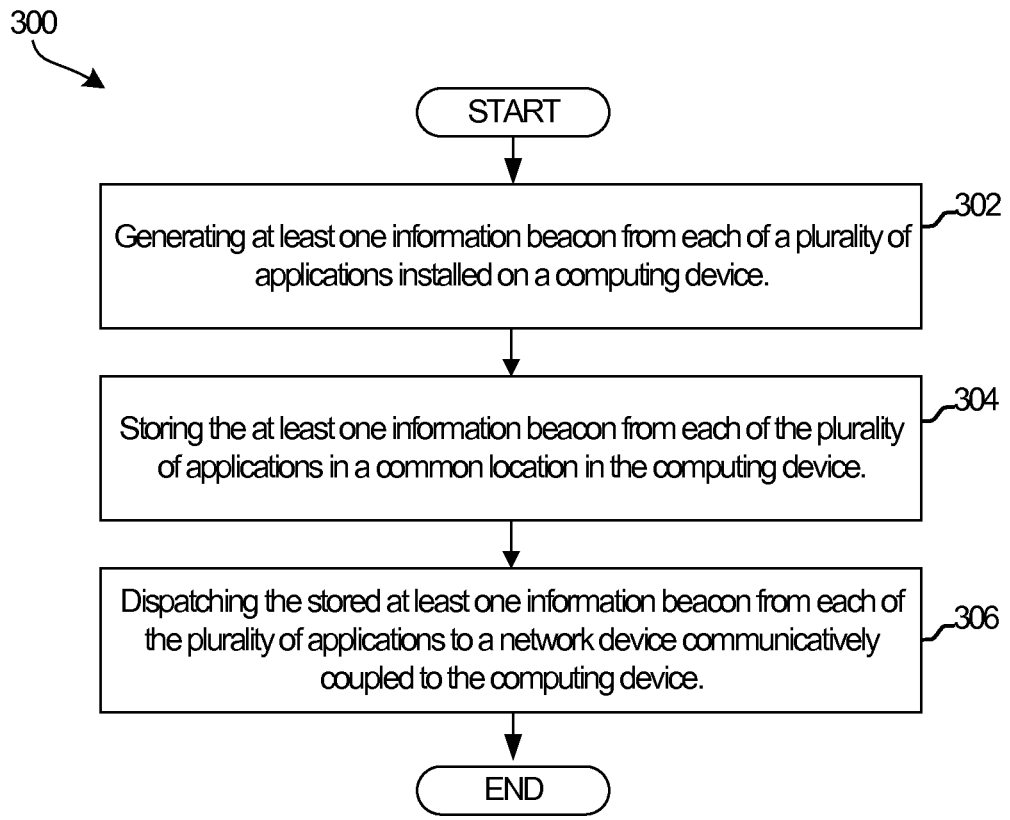
FIG. 3 is a flow chart illustrating example steps of a method for centralized dispatching of application analytics, in accordance with an embodiment of the disclosure.

FIG. 3 is a flow chart illustrating example steps of a method for centralized dispatching of application analytics, in accordance with an embodiment of the disclosure. Referring to FIGS. 1-3, the example method 300 may start at 302, when, in a computing device (100) comprising at least one processor (102) and a memory (104; 105), at least one information beacon (116b, . . . , 118b) may be generated from each of a plurality of applications (116, . . . , 118) installed on the computing device (100). Each information beacon (116b, . . . , 118b) may include application analytics data associated with a corresponding application while the corresponding application is running on the computing device. At 304, the at least one information beacon from each of the plurality of applications may be stored in a common location (e.g., beacon database 105) in the computing device (100). At 306, the stored at least one information beacon (116b, . . . , 118b) may be dispatched to a network device (e.g., analysis server 130) communicatively coupled to the computing device.

The generating of the beacons 116b, . . . , 118b may be triggered by beacon generation code (e.g., SDKs 116a, . . . , 116b) implemented in each of the plurality of applications 116, . . . , 118 installed on the computing device 100. The application analytics data of the beacons 116b, . . . , 118b may include one or more of data identifying an application accessed on the computing device; data identifying data and time an application was accessed on the computing device; for each application running on the computing device, data identifying at least one application segment accessed while the application was running; data identifying characteristics of one or both of the computing device and the operating system used by the computing device; data identifying one or more buttons pushed by a user while an application is running on the computing device; data identifying one or more user interactions with an application running on the computing device; and/or data identifying (application) results achieved while an application is running on the device (additional clarification on data provided by the beacons is referenced herein above in the definition of "beacon").

The at least one information beacon 116b, . . . , 118b from each of the plurality of applications 116, . . . , 118 may be stored in a common database (e.g., beacon database 105) in the computing device 100. The common database (105) may be accessible by each of the plurality of applications 116, . . . , 118. The dispatching of the stored at least one information beacon from each of the plurality of applications may be based on a pre-determined schedule maintained by one or both of the computing device 100 and/or the network device (e.g., analysis server 130).

Figure 4:
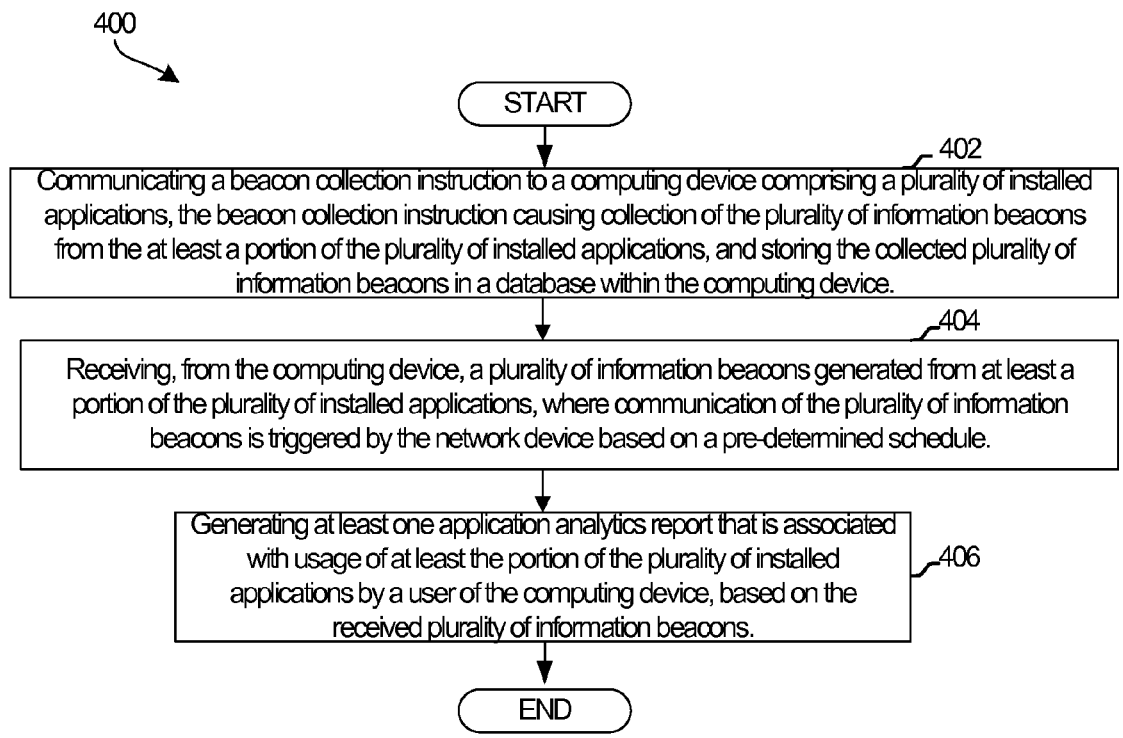
FIG. 4 is a flow chart illustrating example steps of another method for centralized dispatching of application analytics, in accordance with an embodiment of the disclosure.

FIG. 4 is a flow chart illustrating example steps of another method for centralized dispatching of application analytics, in accordance with an embodiment of the disclosure. Referring to FIGS. 1-2 and 4, the example method 400 may start at 402, when a beacon collection instruction (e.g., from the beacon collection module 202) may be communicated from the analysis server 130 to a computing device 100. The computing device 100 may include a plurality of installed applications (116, . . . , 118). The beacon collection instruction may causing collection of the plurality of information beacons (e.g., 116b, . . . , 118b) from the at least a portion of the plurality of installed applications (116, . . . , 118), and storing the collected plurality of information beacons in a database (e.g., beacon database 105) within the computing device 100.

At 402, a plurality of information beacons (116b, . . . , 118b) generated from at least a portion of the plurality of installed applications (116, . . . , 118) may be received from the computing device 100. Communication of the plurality of information beacons may be triggered by the network device (e.g., 130) based on a pre-determined schedule (e.g., schedule or policy set by the beacon dispatch module 204). At 406, at least one application analytics report may be generated (e.g., by the analytic report generation module 206). The application analytics report may be associated with usage of at least the portion of the plurality of installed applications by a user of the computing device, based on the received plurality of information beacons.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for centralized dispatching of application analytics.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

What is claimed is:

1. A mobile computing device, comprising:
   a memory configured to store applications and beacon service code;
   a beacon database configured to store, according to a beacon collection policy, information beacons;
   a communication subsystem configured to provide at least one of a wired or wireless connection to an analysis server; and
   a processor configured to operate, concurrently, the applications and the beacon service code, the applications configured to generate, concurrently, the information beacons, the information beacons configured to provide analytics data about the applications while the applications are operating, the beacon service code configured to implement a beacon dispatch policy to dispatch, in a single transmission, the information beacons to the analysis server.

2. The mobile computing device of claim 1, wherein the processor is a main processor.

3. The mobile computing device of claim 1, wherein the processor is at least one application processor.

4. The mobile computing device of claim 1, wherein the beacon service code is a part of an operating system.

5. The mobile computing device of claim 1, wherein the beacon service code is a service application separate from an operating system.

6. The mobile computing device of claim 1, wherein the analytics data comprises at least one of data that identifies a corresponding application, data that identifies a date and time that the corresponding application was accessed, data that identifies at least one application segment, of the corresponding application, that was accessed, data that identifies at least one characteristic of the mobile computing device, data that identifies at least one characteristic of an operating system of the mobile computing device, or data that identifies at least one button activated by a user while the corresponding application is running on the mobile computing device.

7. The mobile computing device of claim 1, wherein the beacon database is implemented in the memory.

8. The mobile computing device of claim 1, wherein the beacon database is implemented in a module separate from the memory.

9. The mobile computing device of claim 1, wherein the mobile computing device is configured to implement beacon collection in response to a signal received from the analysis server.

10. The mobile computing device of claim 1, wherein the mobile computing device is configured to implement beacon dispatch in response to a signal received from the analysis server.

11. The mobile computing device of claim 1, wherein the beacon dispatch policy is configured to control at least one of a frequency of the single transmission, a number of the information beacons included in the single transmission, a compression of the single transmission, or an encryption of the single transmission.

12. The mobile computing device of claim 1, wherein the applications include software development kits, the software development kits configured to generate the information beacons.

13. A non-transitory computer-readable medium storing computer code for controlling a processor to cause the processor to dispatch information beacons, the computer code including instructions to cause the processor to:
   generate, by a first application, a first information beacon that provides application analytics data describing use of the first application installed on a mobile computing device while the first application is running on the mobile computing device;
   generate, concurrently with the first information beacon and by a second application that is running concurrently with the first application, a second information beacon that provides application analytics data describing use of the second application running on the mobile computing device while the first application is running on the mobile computing device;
   collect the first information beacon and second information beacon according to a beacon collection policy that stores the first information beacon and second information beacon in a common location in the mobile computing device; and
   dispatch the first information beacon and the second information beacon, according to a beacon dispatch policy maintained by the mobile computing device, to a network device communicatively coupled to the mobile computing device in a single transmission.

14. The non-transitory computer-readable medium of claim 13, wherein the analytics data describing use of the first application or the second application comprises one or more of:
   an indication of an application accessed on the mobile computing device;
   an indication of date and time an application was accessed on the mobile computing device;
   an indication of characteristics of one or both of the mobile computing device and the operating system used by the mobile computing device;
   an indication of one or more buttons pushed by a user while the first application or the second application is running on the mobile computing device; or
   an indication of one or more user interactions with the first application or the second application running on the mobile computing device.

15. The non-transitory computer-readable medium of claim 13, wherein the computer code including the instructions to cause the processor to generate the first information beacon and to generate the second information beacon is configured to be triggered by beacon generation code implemented in each of the first application and the second application installed on the mobile computing device.

16. The non-transitory computer-readable medium of claim 13, wherein the computer code including the instructions to cause the processor to dispatch the first information beacon and second information beacon is based on a predetermined schedule maintained by one or both of the mobile computing device and the network device according to the beacon collection policy.

17. The non-transitory computer-readable medium of claim 13, wherein the first information beacon and the second information beacon are collected simultaneously.

* * * * *